US012653169B2

(12) United States Patent
Nakagawa et al.

(10) Patent No.: US 12,653,169 B2
(45) **Date of Patent: *Jun. 16, 2026**

(54) FISHING ROD

(71) Applicant: GLOBERIDE, Inc., Higashikurume (JP)

(72) Inventors: Shintaro Nakagawa, Higashikurume (JP); Hirokazu Yamamoto, Higashikurume (JP)

(73) Assignee: GLOBERIDE, INC., Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 18/542,957

(22) Filed: Dec. 18, 2023

(65) Prior Publication Data

US 2024/0298623 A1 Sep. 12, 2024

(30) Foreign Application Priority Data

Mar. 8, 2023 (JP) ................................. 2023-035166

(51) Int. Cl.
*A01K 87/08* (2006.01)
(52) U.S. Cl.
CPC .................................... *A01K 87/08* (2013.01)
(58) Field of Classification Search
CPC .... A01K 87/08; A01K 87/008; A01K 87/009; A01K 87/02; F16B 7/04; F16B 7/0406; F16B 7/0413; F16B 7/042; F16B 21/06; Y10T 403/4991
See application file for complete search history.

(56) References Cited

U.S. PATENT DOCUMENTS

| | | | | |
|---|---|---|---|---|
| 638,554 A | * | 12/1899 | Burton | .................... B21C 23/01 |
| | | | | 29/523 |
| 3,579,809 A | * | 5/1971 | Wolf | ........................ F16B 5/045 |
| | | | | 29/522.1 |
| 3,599,318 A | * | 8/1971 | Behlen | ................. B21D 39/035 |
| | | | | 29/21.1 |
| 4,523,780 A | * | 6/1985 | Cheer | ................... F16B 7/0413 |
| | | | | 285/424 |
| 5,297,886 A | * | 3/1994 | Jansen | .................. F16B 7/0413 |
| | | | | 403/302 |
| 5,881,489 A | * | 3/1999 | Young | ................ A01K 89/0102 |
| | | | | 43/20 |

(Continued)

FOREIGN PATENT DOCUMENTS

| | | | |
|---|---|---|---|
| CA | 2612948 A1 | 6/2008 | |
| CN | 112167193 A * | 1/2021 | ........... A01K 87/007 |

(Continued)

OTHER PUBLICATIONS

KR 20150002885 U Translation (Year: 2015).*

(Continued)

*Primary Examiner* — Katelyn T Truong
(74) *Attorney, Agent, or Firm* — Oliff PLC

(57) ABSTRACT

A fishing rod comprises a rod; and a grip body attached to a rear end of the rod. The grip body comprises a main body portion protruding from the rear end of the rod, and a first insertion portion extending from the main body portion to a rod side and inserted into the rod. A first deformation portion recessed in a direction away from an inner peripheral surface of the rod is provided on an outer peripheral surface of the first insertion portion.

5 Claims, 8 Drawing Sheets

(56) References Cited

U.S. PATENT DOCUMENTS

| | | | | |
|---|---|---|---|---|
| 7,827,668 B2 * | 11/2010 | McKee | .................. | E21B 17/20 |
| | | | | 29/515 |
| 2006/0059765 A1 * | 3/2006 | Smith | .................. | A01K 87/08 |
| | | | | 43/25 |
| 2019/0223420 A1 * | 7/2019 | Ito | .................. | A01K 87/02 |

FOREIGN PATENT DOCUMENTS

| | | | | | | |
|---|---|---|---|---|---|---|
| CN | 114903017 A | * | 8/2022 | ............ | A01K 87/06 |
| JP | H06-71400 B2 | | 9/1994 | | |
| JP | H07-61 U | | 1/1995 | | |
| JP | H10-14453 A | | 1/1998 | | |
| JP | 2001-204310 A | | 7/2001 | | |
| JP | 2001-321029 A | | 11/2001 | | |
| JP | 2005-312400 A | | 11/2005 | | |
| JP | 2008-011703 A | | 1/2008 | | |
| JP | 2016077254 A | * | 5/2016 | ............ | A01K 87/08 |
| JP | 2020-103227 A | | 7/2020 | | |
| JP | 2022-121083 A | | 8/2022 | | |
| KR | 19990009535 U | * | 3/1999 | | |
| KR | 20150002885 U | * | 7/2015 | | |
| KR | 101566653 B1 | * | 11/2015 | | |
| KR | 10-2016-0062969 A | | 6/2016 | | |
| KR | 20180043505 A | * | 4/2018 | | |
| KR | 101872850 B1 | * | 6/2018 | | |

OTHER PUBLICATIONS

Oct. 30, 2024 Examination Report issued in Australian Patent Application No. 2023285719.
Jun. 6, 2024 combined Search and Examination Report issued in British Patent Application No. 2400186.9.
Nov. 28, 2025 Office Action cited in Chinese Application No. 202410199912.X.
Dec. 27, 2022 International Search Report issued in International Patent Application No. PCT/JP2022/040048.
Jun. 20, 2024 International Preliminary Report on Patentability issued in International Patent Application No. PCT/JP2022/040048.
Feb. 19, 2025 Examination Report issued in Australian Patent Application No. 2022423457.
Mar. 11, 2025 Office Action issued in Japanese Patent Application No. 2021-211403.
Aug. 17, 2025 Office Action issued in Chinese Patent Application No. 202280067042.X.
May 7, 2025 Office Action issued in U.S. Appl. No. 18/696,215.
Aug. 15, 2025 Notice of Allowance issued in U.S. Appl. No. 18/696,215.
Jan. 27, 2026 Office Action issued in Japanese Application No. 2023-035166.
Mar. 18, 2026 Office Action issued in Singapore Application No. 10202400012X.

* cited by examiner

FISHING ROD

CROSS-REFERENCE TO RELATED APPLICATION

This application claims priority under 35 U.S.C. § 119 to Japanese Patent Application No. 2023-035166 filed on Mar. 8, 2023 in the Japanese Patent Office, the entire contents of each hereby incorporated by reference.

BACKGROUND OF THE INVENTION

1. Technical Field

The present invention relates to a fishing rod.

2. Description of the Related Art

A fishing rod configured by inserting a hollow portion of a grip body onto an outer peripheral surface of a rod has been known (for example, refer to FIG. 3 of JP 2020-103227 A). In the fishing rod of the related art, for example, the outer peripheral surface of the rod and an inner peripheral surface of the grip body are bonded and coupled to each other.

SUMMARY OF THE INVENTION

In the grip body bonded to the outer peripheral surface of the rod, when the bonding area between the grip body and the rod is increased to secure joining strength, the size of the grip body is increased, which is a problem. In order to downsize the grip body, it can be considered that a grip body including an insertion portion bonded to an inner peripheral surface of the rod is attached to the rod. However, when the inner surface of the rod and the insertion portion of the grip body are bonded to each other, lengthening the insertion portion is required to secure the joining strength. In addition, in the case of using an adhesive, the adhesive is pushed out to the outside when an insertion portion of a rear grip is inserted onto the inner surface of the rod, it is difficult to apply the adhesive, which is a problem.

The present invention has been made to solve the above-described problems, and an object of the present invention is to provide a fishing rod that allows for an increase in joining strength and a reduction in weight.

A fishing rod according to the present invention comprises a rod; and a grip body attached to a rear end of the rod. The grip body comprises a main body portion protruding from the rear end of the rod, and a first insertion portion extending from the main body portion to a rod side and inserted into the rod. A first deformation portion recessed in a direction away from an inner peripheral surface of the rod is provided on an outer peripheral surface of the first insertion portion.

According to the present invention, the inner peripheral surface of the rod and the first insertion portion of the grip body are bonded to each other, and the main body portion of the grip body is exposed to the outside of the rod. Accordingly, the grip body can be downsized. In addition, since the first deformation portion is formed on the first insertion portion, joining strength can be easily increased by bonding, screwing, engagement, or the like between the rod and the first deformation portion.

In addition, it is preferable that the first insertion portion is bonded to the inner peripheral surface of the rod with an adhesive.

According to the present invention, since the adhesive remains in the first deformation portion, the joining strength between the first insertion portion and the rod can be further increased due to an anchor effect, and bonding work can be easily performed.

In addition, it is preferable that the first insertion portion comprises a milling surface that is flat and formed on the outer peripheral surface of the first insertion portion along an axial direction of the rod, and that the first deformation portion is formed on the milling surface.

According to the present invention, the adhesive is guided to the milling surface and moves to the first deformation portion, so that the adhesive can be introduced without being squeezed to the outside.

In addition, it is preferable that the first deformation portion is formed on a proximal end side of the first insertion portion.

When the first deformation portion is formed on a distal end side of the first insertion portion, for example, the adhesive stays on the distal end side, which is a risk; however, according to the present invention, the adhesive can be guided to the proximal end side, and a large bonding area can be secured.

In addition, it is preferable that the grip body is hollow and comprises a rod plug inserted into a hollow portion of the grip body, that the rod plug comprises a base portion inserted into the grip body, and a second insertion portion extending from the base portion and inserted onto an inner peripheral surface of the first insertion portion, and that a second deformation portion recessed in the direction away from the inner peripheral surface of the rod and engaging with the first deformation portion is provided on an outer peripheral surface of the second insertion portion.

According to the present invention, the joining strength between the rod and the grip body can be further increased by inserting the rod plug into the grip body and inserting the second insertion portion of the rod plug into the first insertion portion. In addition, the second insertion portion can be easily locked to the first insertion portion by engaging the first deformation portion and the second deformation portion with each other.

According to the present invention, it is possible to provide the fishing rod that allows for an increase in joining strength and a reduction in weight.

DETAILED DESCRIPTION

First Embodiment

Hereinafter, a first embodiment of a fishing rod of the present invention will be described with reference to the accompanying drawings. Note that in the description of the drawings, the same elements are denoted by the same reference signs, and duplicate descriptions will be omitted as appropriate. In the following description, "front-rear", "left-right", and "up-down" conform to the arrows in FIGS. 1 and 3. The directions are used for convenience of description, and do not limit directions of the present invention.

Figure 1:
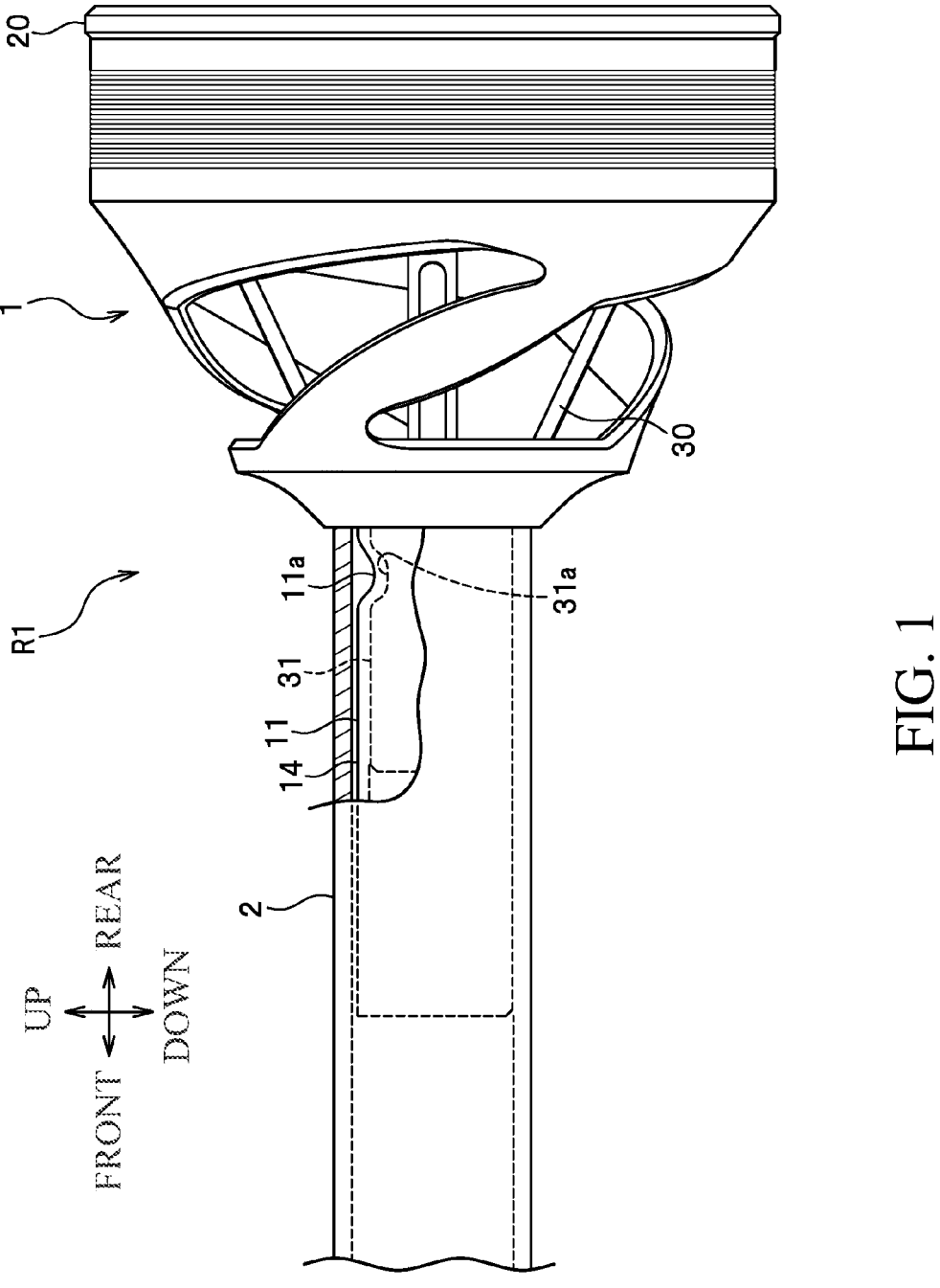
FIG. 1 is a side view illustrating a fishing rod according to a first embodiment of the present invention.
Figure 2:
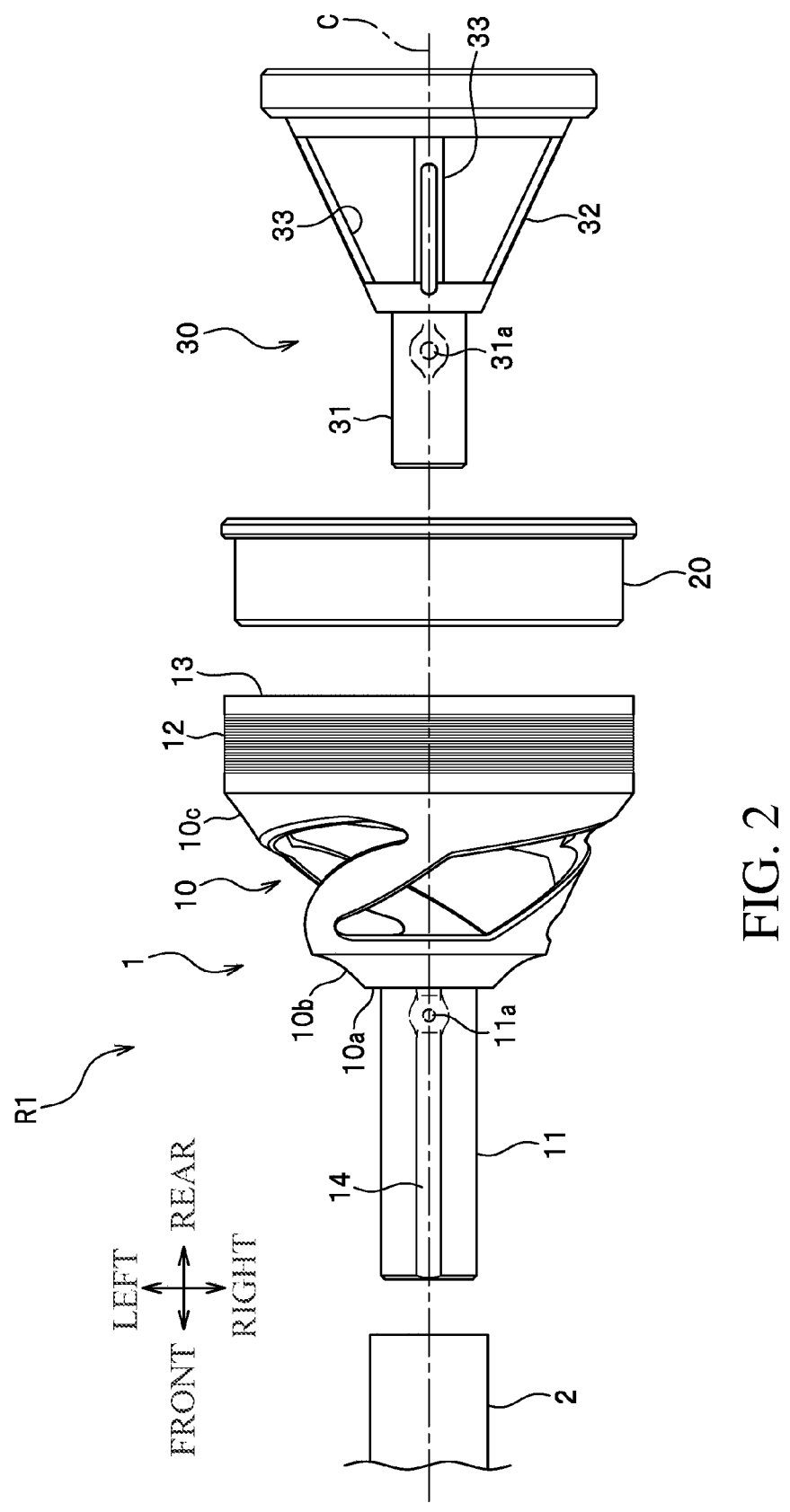
FIG. 2 is an exploded side view illustrating each configuration of the fishing rod according to the first embodiment.

As illustrated in FIGS. 1 and 2, a fishing rod R1 comprises a grip body 1, a rod 2, a protection ring 20, and a rod plug 30. The rod 2 is a cylindrical member made of resin or wood and serving as a body of the fishing rod R1. The rod 2 may be composed of a single rod or may have a joint structure composed of a plurality of rods.

As illustrated in FIG. 2, the grip body 1 of the present embodiment is hollow and comprises a main body portion 10, a first insertion portion 11, and a large-diameter portion 12. The grip body 1 can be made of resin or metal, but is not limited thereto.

Figure 3:
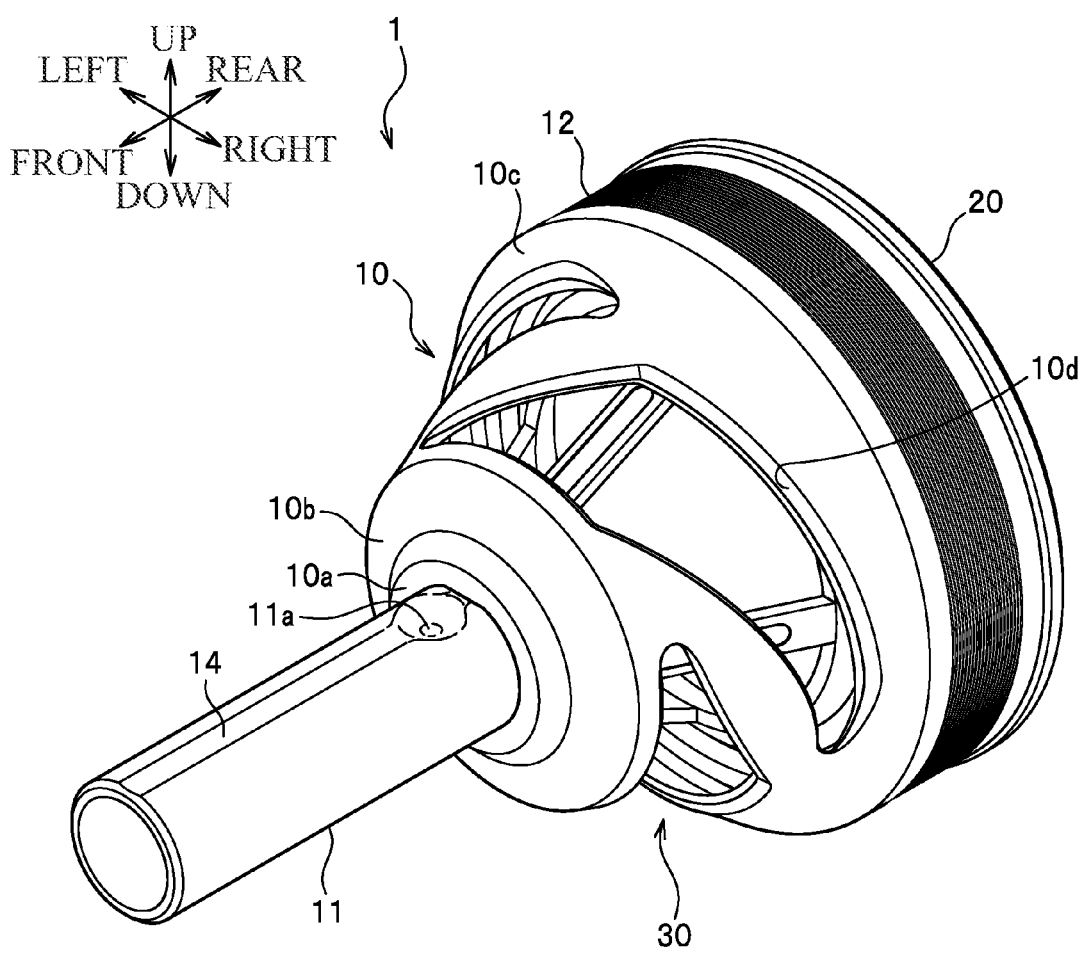
FIG. 3 is a perspective view illustrating a grip body and a rod plug according to the first embodiment.
Figure 4:
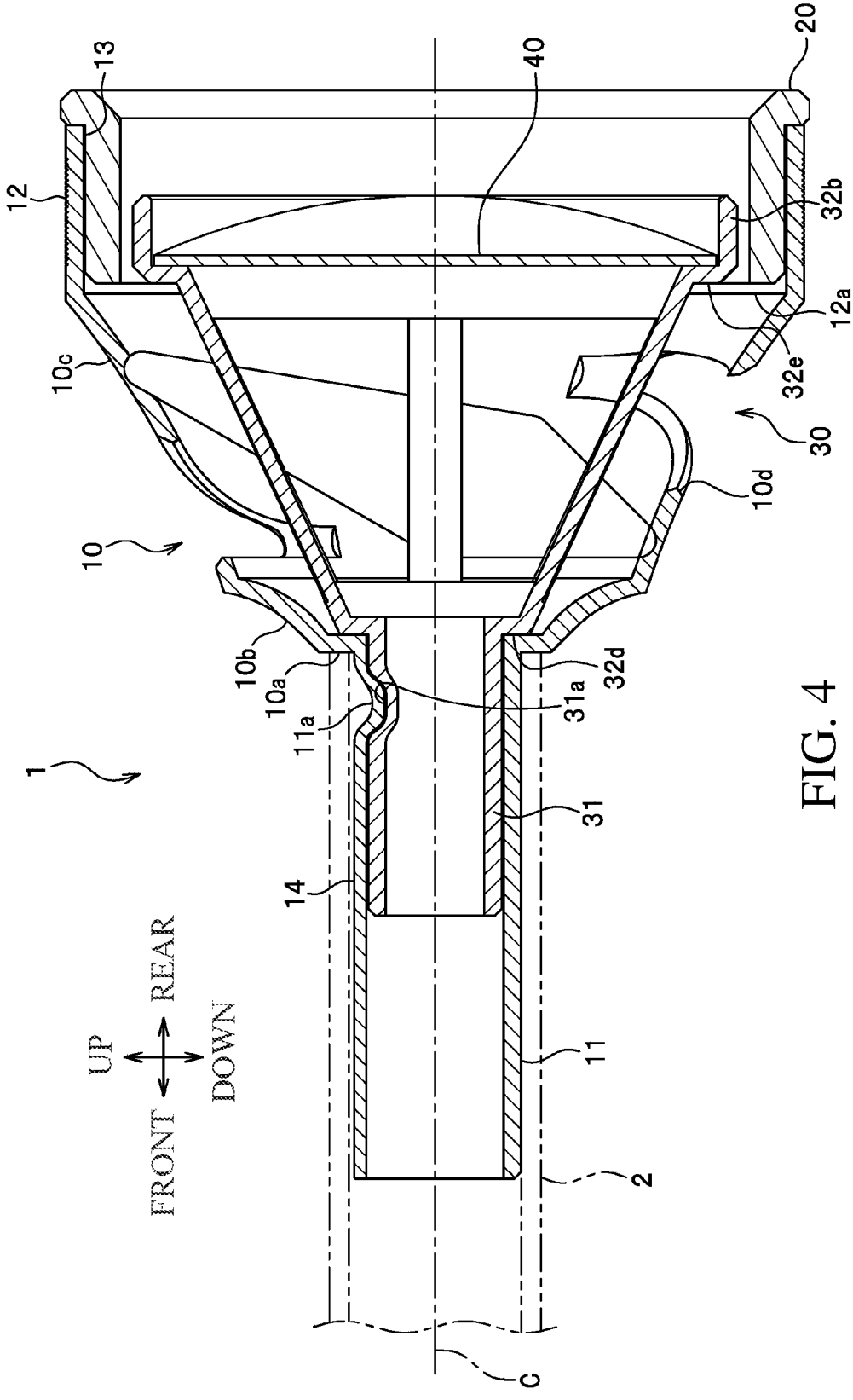
FIG. 4 is a side cross-sectional view illustrating the grip body and the rod plug according to the first embodiment.

As illustrated in FIGS. 3 and 4, the main body portion 10 has a substantially truncated cone shape, and comprises a receiving portion 10a, a first enlarged diameter portion 10b, and a second enlarged diameter portion 10c. The receiving portion 10a projects perpendicularly from a proximal end of the first insertion portion 11 in a radially outward direction.

The first enlarged diameter portion 10b is a portion that is continuous with the receiving portion 10a and that is enlarged in diameter as the portion extends away from the first insertion portion 11. The first enlarged diameter portion 10b may be a flat surface, but in the present embodiment, is formed as a curved surface that is slightly recessed toward an axis C. The second enlarged diameter portion 10c is a portion that is continuous with the first enlarged diameter portion 10b and that is enlarged in diameter as the portion extends away from the first insertion portion 11. The second enlarged diameter portion 10c may be a flat surface, but in the present embodiment, is formed as a curved surface that is slightly recessed toward the axis C. An inclination angle of the second enlarged diameter portion 10c with respect to the axis C is smaller than an inclination angle of the first enlarged diameter portion 10b with respect to the axis C. A length of the second enlarged diameter portion 10c in the direction of the axis C is longer than a length of the first enlarged diameter portion 10b in the direction of the axis C.

Grip openings 10d that are open laterally are formed in the second enlarged diameter portion 10c. The shape and number of the grip openings 10d are not particularly limited, and in the present embodiment, three openings that are cut obliquely in a circumferential direction are formed.

The first insertion portion 11 extends from the main body portion 10 toward a rod 2 side, and has a cylindrical shape. The first insertion portion 11 is a portion inserted into the rod 2, and is formed with a smaller diameter than an inner diameter of the rod 2. An outer diameter of the first insertion portion 11 is not particularly limited, and is, for example, 1.0 mm to 12.0 mm. In the present embodiment, an outer peripheral surface of the first insertion portion 11 and an inner peripheral surface of the rod 2 are bonded to each other with an adhesive. Note that the first insertion portion 11 of the present embodiment has a cylindrical shape; however, the first insertion portion 11 may be appropriately changed to match the shape of an inner space of the rod 2.

As illustrated in FIG. 3, the first insertion portion 11 comprises a first deformation portion 11a formed on the outer peripheral surface of the first insertion portion 11 and recessed in a direction away from the inner peripheral surface of the rod 2 (radially inward direction), and a milling surface 14 formed on the outer peripheral surface of the first insertion portion 11 along an axial direction of the rod 2. The first deformation portion 11a is formed on the milling surface 14 on a proximal end side (main body portion 10 side) of the first insertion portion 11. The first deformation portion 11a is recessed in a circular shape in the present embodiment, but may have another shape. In addition, one first deformation portion 11a is formed on the proximal end side in the present embodiment, but may be formed at another portion, and the first deformation portions 11a may be formed at a plurality of locations. The milling surface 14 is a flat surface, and is a portion that guides an adhesive to the first deformation portion 11a when the first insertion portion 11 is inserted into the rod 2. The milling surfaces 14 may be formed at a plurality of locations or may be omitted.

The large-diameter portion 12 extends continuously from the main body portion 10 toward a rod base side, and has a cylindrical shape. The large-diameter portion 12 comprises an opening 13 that is open toward the rod base side. A plurality of fine recessed grooves are formed on an outer peripheral surface of the large-diameter portion 12 over the circumferential direction. The recessed grooves may be omitted; however, the grip force can be increased by providing the recessed grooves. A projecting portion 12a projecting toward the axis C is formed on an inner peripheral surface of the large-diameter portion 12. The protection ring 20 is attached to a peripheral edge of the opening 13. The protection ring 20 has a cylindrical shape, and is configured as a resin member, a metal member, a soft member, or the like.

Figure 5:
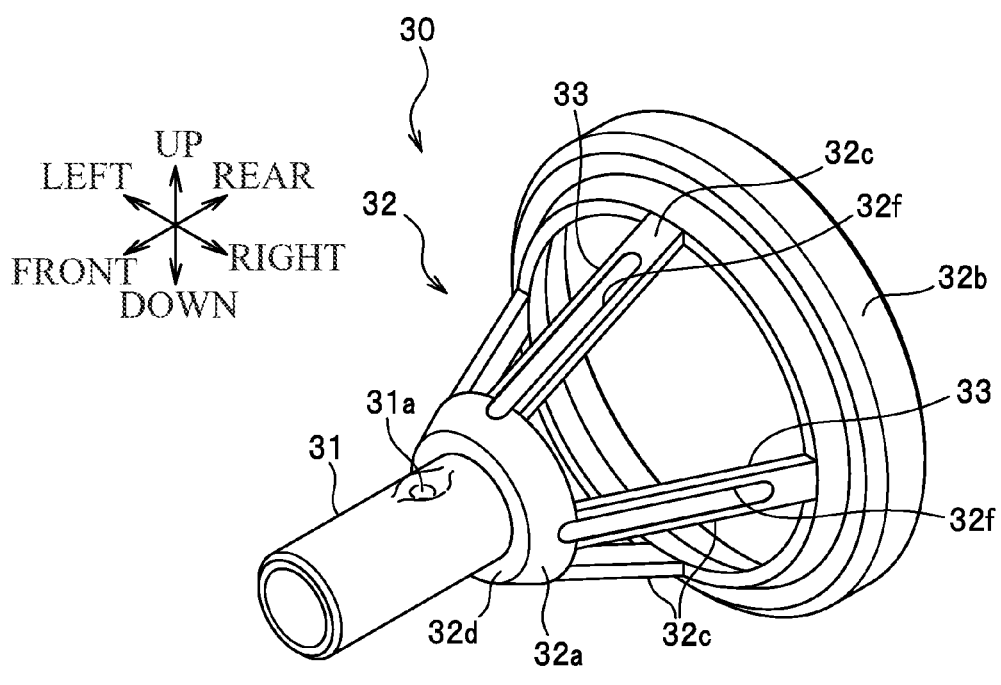
FIG. 5 is a perspective view illustrating the rod plug according to the first embodiment.
Figure 6:
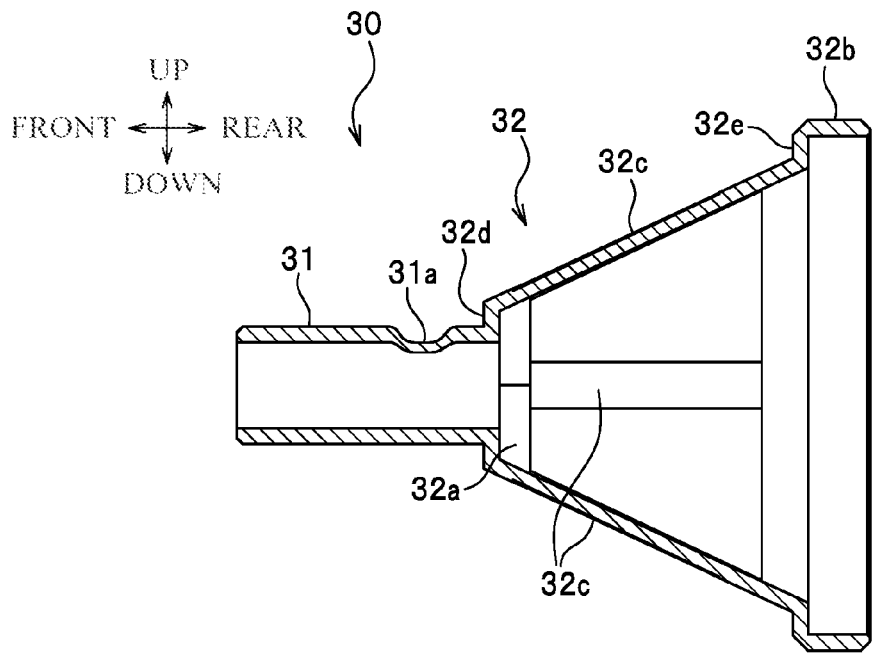
FIG. 6 is a side cross-sectional view illustrating the rod plug according to the first embodiment.

As illustrated in FIGS. 5 and 6, the rod plug 30 is hollow and comprises a second insertion portion 31 and a base portion 32. The second insertion portion 31 extends forward from the base portion 32, and has a cylindrical shape. The second insertion portion 31 is formed with a smaller diameter than an inner diameter of the first insertion portion 11 (refer to FIG. 3). An outer peripheral surface of the second insertion portion 31 is bonded to an inner peripheral surface of the first insertion portion 11 with an adhesive. A length of the second insertion portion 31 may be appropriately set depending on the bonding strength, and in the present embodiment, is shorter than a length of the first insertion portion 11.

A second deformation portion 31a recessed in the direction away from the inner peripheral surface of the rod 2 (radially inward direction) is formed on the outer peripheral surface of the second insertion portion 31. As illustrated in FIG. 4, the second deformation portion 31a is formed at a position corresponding to the first deformation portion 11a. Namely, the second deformation portion 31a is formed such that the second deformation portion 31a and the first deformation portion 11a overlap each other in a state where the second insertion portion 31 is inserted into the first insertion portion 11. By causing the second deformation portion 31a to overlap the first deformation portion 11a, the first deformation portion 11a and the second deformation portion 31a are engaged with each other, and the second insertion portion 31 is locked to the first insertion portion 11.

The base portion 32 is formed to be continuous with the second insertion portion 31, and has a substantially truncated cone shape. The base portion 32 is formed with a larger diameter than that of the rod 2. The base portion 32 comprises a base small-diameter portion 32a that is continuous with the second insertion portion 31; a base large-diameter portion 32b formed with a larger diameter than that of the base small-diameter portion 32a; and four base body portions 32c connecting the base small-diameter portion 32a and the base large-diameter portion 32b. The base small-diameter portion 32a has an annular shape, and is formed with a larger diameter than that of a proximal end of the second insertion portion 31. A step portion 32d projecting perpendicularly in the radially outward direction is formed at the proximal end of the second insertion portion 31. The base large-diameter portion 32b has a cylindrical shape, and is formed to be continuous with the base body portions 32c. An outer diameter of the base large-diameter portion 32b is smaller than an inner diameter of the protection ring 20. A step portion 32e projecting in the radially outward direction is formed between the base body portions 32c and the base large-diameter portion 32b.

The base body portions 32c are plate-shaped portions connecting the base small-diameter portion 32a and the base large-diameter portion 32b. Groove portions 32f are formed on the surfaces of the base body portions 32c along an extending direction. The strength of the base body portions 32c can be increased by providing the groove portions 32f. Ribs may be provided instead of the groove portions 32f, or the groove portions 32f may be omitted. A rod plug opening 33 that is open laterally is formed between the base body portions 32c and 32c adjacent to each other. The shape and number of the rod plug openings 33 are not limited; however, in the present embodiment, four openings having a substantially trapezoidal shape in a side view are formed.

Next, a method for manufacturing a fishing rod according to the present embodiment will be described. In the method for manufacturing a fishing rod, an assembly step, a deformation step, and a rod insertion step are performed. The following manufacturing method is one example, and the order of the steps may be changed as appropriate.

The assembly step is a step of assembling a composite body comprising the grip body 1. The grip body 1 and the rod plug 30 are assembled. An adhesive is applied to the outer peripheral surface of the second insertion portion 31 of the rod plug 30, and the second insertion portion 31 of the rod plug 30 is inserted onto the inner peripheral surface of the first insertion portion 11 of the grip body 1 from the rod base side. At this time, the receiving portion 10a of the grip body 1 and the step portion 32d of the rod plug 30 come into contact with each other, and the projecting portion 12a of the grip body 1 and the step portion 32e of the rod plug 30 come into contact with each other.

In addition, a lid plate 40 is attached to the inside of the base large-diameter portion 32b of the rod plug 30 with an adhesive or the like. Design or the like is applied to a rear surface (surface on the rod base side) of the lid plate 40. In addition, the protection ring 20 is attached to the inner peripheral surface of the large-diameter portion 12.

Figure 7:
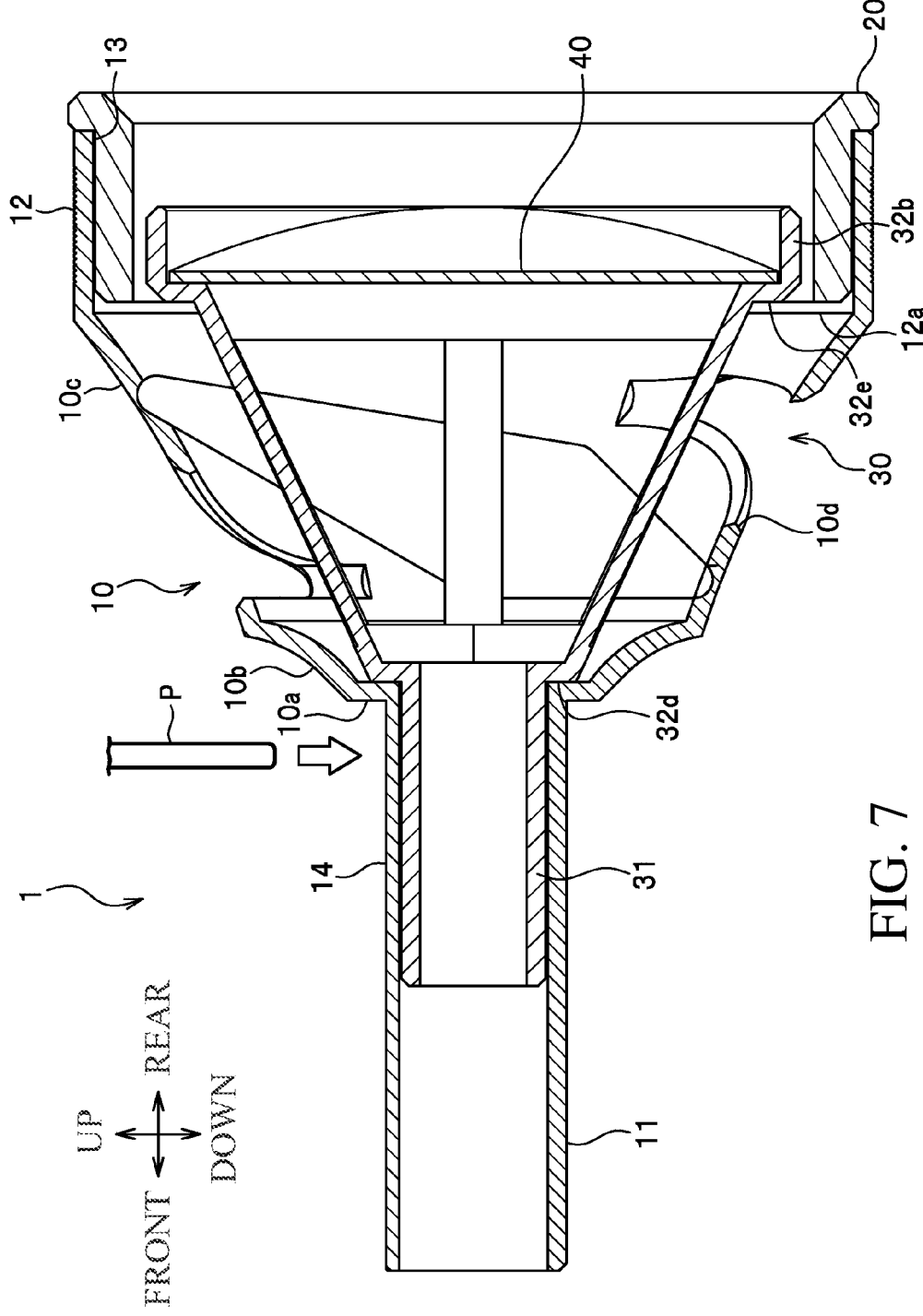
FIG. 7 is a view illustrating a method for manufacturing a fishing rod according to the first embodiment.

The deformation step is a step of forming deformation portions on the first insertion portion 11 and the second insertion portion 31. In the deformation step, as illustrated in FIG. 7, after the assembly of the rod plug 30 and the like to the grip body 1 is completed, the proximal end sides of the first insertion portion 11 and the second insertion portion 31 are pressed from the radially outward direction by a press machine P. In the present embodiment, the proximal end side of the milling surface 14 of the first insertion portion 11 is pressed. Accordingly, as illustrated in FIG. 4, the first deformation portion 11a and the second deformation portion 31a are formed such that the first insertion portion 11 and the second insertion portion 31 are plastically deformed to overlap and engage with each other.

Figure 8:
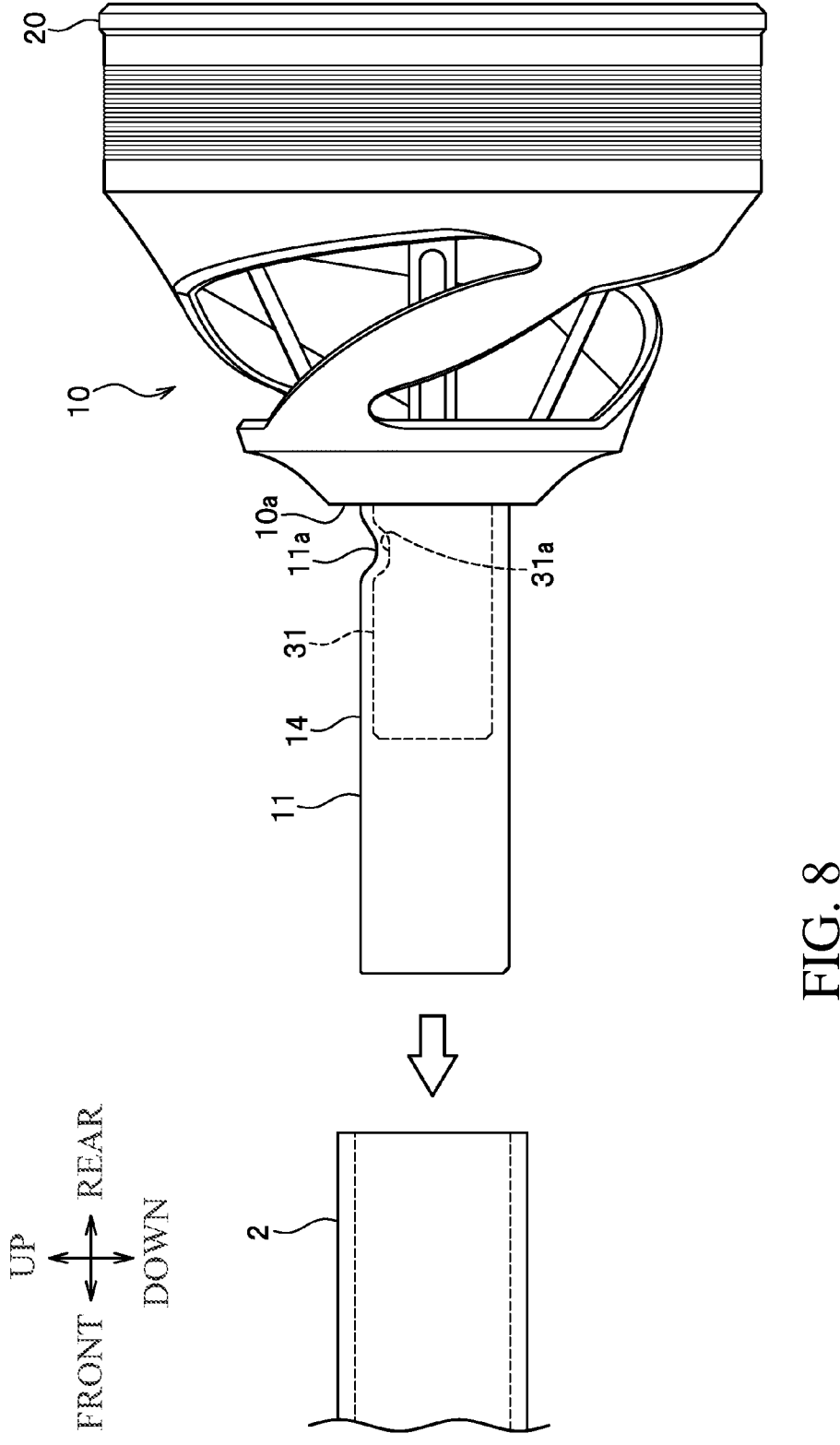
FIG. 8 is a view illustrating a mode in which the grip body is inserted into a rod.

The rod insertion step is a step of inserting the first insertion portion 11 into the rod 2. In the rod insertion step, as illustrated in FIG. 8, an adhesive is applied to the outer peripheral surface of the first insertion portion 11 of the grip body 1, and the first insertion portion 11 is inserted into the rod 2 until a proximal end of the rod 2 touches the receiving portion 10a. As described above, the fishing rod R1 is completed.

According to the fishing rod R1 of the present embodiment described above, the inner peripheral surface of the rod 2 and the first insertion portion 11 of the grip body 1 are bonded to each other, and the main body portion 10 of the grip body 1 is exposed to the outside of the rod 2. In the related art, since the form is such that a grip is bonded to an outer peripheral surface of a rod, the grip also has to be made large in accordance with a bonding margin; however, as in the present embodiment, when the form is such that the first insertion portion 11 is inserted into the rod 2, the main body portion 10 of the grip body 1 can be downsized regardless of the bonding margin.

In addition, since the first deformation portion 11a is formed on the first insertion portion 11, joining strength can be easily increased by bonding between the rod 2 and the first deformation portion 11a. In other words, since the adhesive remains in the first deformation portion 11a, the joining strength between the first insertion portion 11 and the rod 2 can be further increased due to an anchor effect, and bonding work can be easily performed.

In addition, the milling surface 14 that is flat and that is formed along the axial direction of the rod 2 is formed on the outer peripheral surface of the first insertion portion 11, and the first deformation portion 11a is formed on the milling surface 14. Accordingly, the adhesive is guided to the milling surface and moves to the first deformation portion 11a, so that the adhesive can be introduced without being squeezed to the outside.

In addition, the first deformation portion 11a is formed on the proximal end side of the first insertion portion 11. Accordingly, the adhesive can be guided to the proximal end side, and a large bonding area can be secured. In addition, when the first deformation portion 11a and the second deformation portion 31a are formed by plastic deformation as in the present embodiment, damage can be prevented by forming the first deformation portion 11a and the second deformation portion 31a on the proximal end side rather than a distal end side.

In addition, the grip body 1 is hollow, the rod plug 30 inserted into a hollow portion of the grip body 1 is provided, and the rod plug 30 comprises the base portion 32 inserted into the grip body 1, and the second insertion portion 31 extending from the base portion 32 and bonded to the inner peripheral surface of the first insertion portion 11. Accordingly, the joining strength between the rod 2 and the grip body 1 can be further increased by inserting the rod plug 30 into the grip body 1 and inserting the second insertion portion 31 of the rod plug 30 into the first insertion portion 11. In other words, a joint portion between an end of the rod 2 and the grip body 1 is a portion on which a large force acts; however, since the first insertion portion 11 and the second insertion portion 31 form a double structure, the strength can be increased.

In addition, the second insertion portion 31 can be easily locked to the first insertion portion 11 by engaging the first deformation portion 11a and the second deformation portion 31a with each other. The first insertion portion 11 and the second insertion portion 31 may be bonded to each other; however, in the present embodiment, both may be engaged with each other only by plastic deformation due to caulking. Accordingly, a transition to the rod insertion step can be made without waiting for a bonding time, so that the manufacturing cycle can be shortened.

Modification Example 1

Next, modification examples such as a first modification example and a second modification example will be described.

Figure 9:
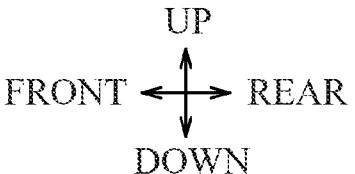
FIG. 9 is a partial cross-sectional view illustrating a modification example of a deformation portion.
Figure 9:
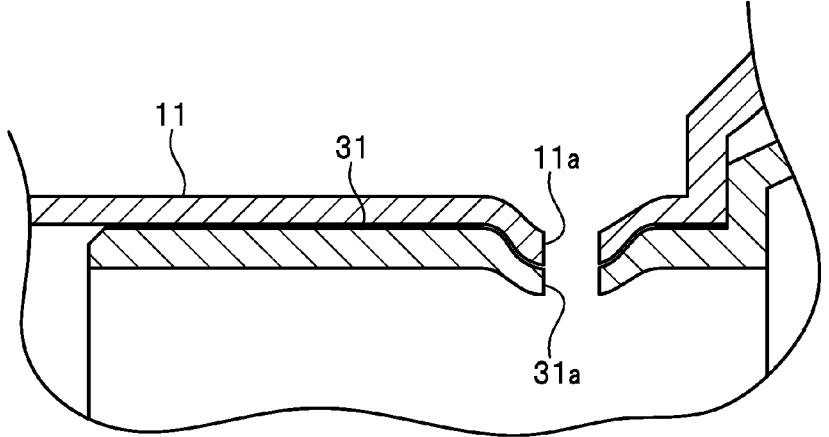

As illustrated in FIG. 9, the first deformation portion 11*a* and the second deformation portion 31*a* may be holes penetrating in an up-down direction. Even in such a modification example, an adhesive can be guided to the first deformation portion 11*a* and the second deformation portion 31*a*, and the joining strength between the first insertion portion 11 and the rod 2 can be further increased due to an anchor effect. The first deformation portion 11*a* and the second deformation portion 31*a* may be pressed by the press machine P to penetrate. Accordingly, the first deformation portion 11*a* and the second deformation portion 31*a* that are fractured engage and overlap each other, so that both can be locked. In addition, for example, screw hole machining may be performed instead of using the press machine P. Even in such a case, the same effects as those of Modification Example 1 can be obtained.

The embodiment and the modification examples of the present invention have been described above; however, design change can be made as appropriate without departing from the concept of the invention. For example, in the present embodiment, the rod 2 and the first insertion portion 11 are joined by bonding, but may be joined by engagement, screwing, or the like. For example, both the rod and the first insertion portion may be joined by providing a protrusion on the inner peripheral surface of the rod and engaging the protrusion and the first deformation portion of the first insertion portion with each other. In addition, for example, a male screw may be provided on the inner peripheral surface of the rod, and the male screw and a female screw (first deformation portion recessed in the radially inward direction) of the first insertion portion may be screwed to each other.

Reference Signs List

R1 Fishing rod
1 Grip body
2 Rod
10 Main body portion
10*a* Receiving portion
10*b* First enlarged diameter portion
10*c* Second enlarged diameter portion
11 First insertion portion
11*a* First deformation portion
12 Large-diameter portion
13 Opening
14 Milling surface
20 Protection ring
30 Rod plug 31 Second insertion portion
31*a* Second deformation portion
32 Base portion
33 Rod plug opening

What is claimed is:

1. A fishing rod comprising:
a rod; and
a grip body attached to a rear end of the rod, wherein
the grip body comprises
a main body portion protruding from the rear end of the rod toward an axially outer side of the rod for gripping by a user,
a first insertion portion extending from the main body portion to a rod side and inserted into the rod, and
a first deformation portion recessed in a direction away from an inner peripheral surface of the rod and on an outer peripheral surface of the first insertion portion;
the main body portion comprises an enlarged diameter portion that enlarges in diameter as the enlarged diameter portion extends away from the first insertion portion along an axis of the main body;
the grip body is hollow and comprises a rod plug inserted into a hollow portion of the grip body;
the rod plug comprises
a base portion inserted into the grip body, and
a second insertion portion extending from the base portion and inserted into an inner peripheral surface of the first insertion portion; and
a second deformation portion recessed in the direction away from the inner peripheral surface of the rod and engaging with the first deformation portion is on an outer peripheral surface of the second insertion portion.

2. The fishing rod according to claim 1, wherein the first insertion portion is bonded to the inner peripheral surface of the rod with an adhesive.

3. The fishing rod according to claim 2, wherein the first insertion portion comprises a milling surface that is flat and on the outer peripheral surface of the first insertion portion along an axial direction of the rod, and
the first deformation portion is on the milling surface.

4. The fishing rod according to claim 1, wherein the first deformation portion is on a proximal end side of the first insertion portion.

5. The fishing rod according to claim 1, wherein
the enlarged diameter portion of the main body portion comprises a first diameter enlargement portion and a second diameter enlargement portion, and
an inclination angle of the second enlarged diameter portion with respect to the axis of the main body is smaller than an inclination angle of the first enlarged diameter portion with respect to the axis of the main body.

\* \* \* \* \*